United States Patent
Masuda et al.

(10) Patent No.: US 7,239,982 B2
(45) Date of Patent: Jul. 3, 2007

(54) INFORMATION PROCESSING DEVICE AND METHOD

(75) Inventors: Kiyoshi Masuda, Yao (JP); Hideki Ozeki, Kashiba (JP)

(73) Assignee: Omron Corporation (JP)

( * ) Notice: Subject to any disclaimer, the term of this patent is extended or adjusted under 35 U.S.C. 154(b) by 387 days.

(21) Appl. No.: 10/389,984

(22) Filed: Mar. 18, 2003

(65) Prior Publication Data

US 2003/0186720 A1 Oct. 2, 2003

(30) Foreign Application Priority Data

Mar. 29, 2002 (JP) .............................. 2002-093582

(51) Int. Cl.
*H04B 14/00* (2006.01)
(52) U.S. Cl. ................... 702/189; 702/177; 702/182; 702/188; 340/529; 379/39; 379/106.06
(58) Field of Classification Search ................. 702/50, 702/55, 57–59, 166, 182, 188, 189, 33–35, 702/79, 81, 127, 176–178; 340/527, 500, 340/501, 529; 379/39–42, 106.01–106.03, 379/106.06; 455/551
See application file for complete search history.

(56) References Cited

U.S. PATENT DOCUMENTS

| | | | | |
|---|---|---|---|---|
| 5,404,376 A | * | 4/1995 | Dent ............................ | 375/138 |
| 5,784,338 A | * | 7/1998 | Yankielun et al. ........... | 367/131 |
| 6,411,679 B1 | * | 6/2002 | Khasnabish .................... | 379/9 |
| 2003/0128007 A1 | * | 7/2003 | Fujisaki et al. ............. | 318/560 |

FOREIGN PATENT DOCUMENTS

| | | | | |
|---|---|---|---|---|
| DE | 2634681 A | * | 2/1978 | |
| JP | A-57-13596 | | 1/1982 | |
| JP | A-61-9798 | | 1/1986 | |
| JP | A-62-274474 | | 11/1987 | |
| JP | A-3-294997 | | 12/1991 | |
| JP | 08-130774 | | 5/1996 | |
| JP | 08-265242 | | 10/1996 | |
| JP | 08265242 A | * | 10/1996 | |
| JP | 09026347 A | * | 1/1997 | |
| JP | A-9-26347 | | 1/1997 | |
| JP | 2003-087877 | | 2/2003 | |
| JP | 2003-083793 | | 3/2003 | |
| WO | WO 02081237 A | * | 10/2002 | |

* cited by examiner

*Primary Examiner*—Jeffrey West
(74) *Attorney, Agent, or Firm*—Dickstein Shapiro LLP

(57) ABSTRACT

The present invention suppresses charges incurred by data communications. A controller transmits data values acquired by sensors to a data center at predetermined intervals. When a predetermined interval has elapsed, a data value to be transmitted is compared with the previously transmitted data value, and in the absence of a change that is equal to or more than a predetermined variation amount, this data value is not transmitted. When such a state in which data values are not transmitted continues for a predetermined interval or more, the data value is transmitted irrespective of the data value variation amount. Further, when the data value has changed abruptly, the data value is transmitted even if the predetermined interval has not yet elapsed. The present invention can be applied to a controller that transmits data values acquired by sensors to a data center for collecting these data values.

4 Claims, 7 Drawing Sheets

FIG. 6

| POSITION | A | B | C | D | E | F | G | H | I | J |
|---|---|---|---|---|---|---|---|---|---|---|
| TIME | 0:00 | 0:15 | 0:30 | 0:45 | 1:00 | 1:15 | 1:30 | 1:45 | 2:00 | 2:15 |
| DATA VALUE | 100 | 100 | 120 | 120 | 120 | 120 | 100 | 110 | 110 | 120 |
| TRANSMISSION TIME | ○ | | | ○ | | | ○ | | | ○ |
| PRESENCE/ABSENCE OF TRANSMISSION | ○ | | | ○ | | | ○ | | | ○ |

| POSITION | K | L | M | N | O | P | Q | R | S | T |
|---|---|---|---|---|---|---|---|---|---|---|
| TIME | 2:30 | 2:45 | 3:00 | 3:15 | 3:30 | 3:45 | 4:00 | 4:15 | 4:30 | 4:45 |
| DATA VALUE | 120 | 120 | 120 | 120 | 120 | 120 | 120 | 120 | 120 | 120 |
| TRANSMISSION TIME | | | ○ | | | ○ | | | ○ | |
| PRESENCE/ABSENCE OF TRANSMISSION | | | | | | | | | ○ | |

FIG. 7

| POSITION | A | B | C | D | E | F | G | H | I | J |
|---|---|---|---|---|---|---|---|---|---|---|
| TIME | 0:00 | 0:15 | 0:30 | 0:45 | 1:00 | 1:15 | 1:30 | 1:45 | 2:00 | 2:15 |
| DATA VALUE | 100 | 100 | 120 | 160 | 200 | 170 | 140 | 145 | 150 | 150 |
| TRANSMISSION TIME | ○ | | | ○ | | | ○ | | | ○ |
| PRESENCE/ABSENCE OF TRANSMISSION | ○ | | | ○ | ○ | ○ | ○ | | | |

| POSITION | K | L | M | N | O | P | Q | R | S | T |
|---|---|---|---|---|---|---|---|---|---|---|
| TIME | 2:30 | 2:45 | 3:00 | 3:15 | 3:30 | 3:45 | 4:00 | 4:15 | 4:30 | 4:45 |
| DATA VALUE | 150 | 150 | 150 | 150 | 150 | 150 | 150 | 150 | 150 | 150 |
| TRANSMISSION TIME | | | ○ | | | ○ | | | ○ | |
| PRESENCE/ABSENCE OF TRANSMISSION | | | | | | ○ | | | | |

INFORMATION PROCESSING DEVICE AND METHOD

BACKGROUND OF THE INVENTION

1. Field of the Invention

The present invention relates to an information processing device and method, and more particularly to an information processing device and method suitable for application in a device that performs wireless packet communications.

2. Description of the Related Art

A variety of sensors for judging the quantities and status of predetermined materials exist. There are systems in which data values obtained by such sensors are transmitted wirelessly to a predetermined center, and then transmitted from this center to a user's computer via a network such as the Internet or the like to enable a user to view the data values obtained by the sensors.

Through the use of a system of this kind, the user is able to view data values obtained by sensors installed in remote locations by means of a computer that is in close proximity with the user, whereby the collection of various data for which sensors are employed can be performed in a straightforward manner.

In the system described above, when data values are transmitted from the sensors to the center, transmission charges apply. These charges are sometimes determined in accordance with the time interval for the transmission of the data values, and sometimes determined in accordance with the data volume of the transmitted data values. Further, connection modes include a continuous connection mode for which a state exists in which the sensors that transmit the data values and the center receiving these values are always connected (in a state of being capable of transmitting and receiving data values), and an intermittent connection mode for which a state exists in which a connection only exists while data values are being transmitted and received.

Where the state of the continuous connection mode is concerned, the receipt of data values takes place at predetermined intervals after data relating to settings for the corresponding connection is first received. For example, even when the amount of variation in the data values acquired by the sensor is zero or very small, because the transmission and receipt of data values is performed at predetermined intervals, there are problems such as an increase in the charges incurred for the transmission and receipt of the data values.

Where the state of the intermittent connection mode is concerned, because a connection is made as required, when there is a very small variation amount in the data values obtained by the sensors and the data values need not be transmitted, the transmission content can be controlled. Hence, in comparison with the state of the continuous connection mode, charges incurred by the transmission and receipt of data values can be suppressed. However, the fact that a connection is made as required means that, when a connection is required, data relating to settings for making the connection must be received on every occasion and there is therefore the problem of an increase in the charges incurred to receive the data for these settings.

SUMMARY OF THE INVENTION

In view of the foregoing, it is an object of the present invention to prevent an increase in charges by establishing a connection mode which exhibits the respective virtues of the continuous connection mode and intermittent connection mode.

The information processing device to which the present invention is applied comprises: acquiring means for acquiring measurement results measured by sensors; transmitting means for transmitting, at predetermined intervals, the measurement results thus acquired by the acquiring means; and judging means which, when a predetermined interval has elapsed after a first measurement result is transmitted by the transmitting means and at the time of the transmission of a second measurement result which is acquired by the acquiring means at this time, calculate the variation amount between the first measurement result and the second measurement result and judge whether or not the value of the calculated variation amount is equal to or more than a predetermined value, wherein the second measurement result is transmitted by the transmitting means when the value of the variation amount is judged by the judging means to be equal to or more than the predetermined value, and the second measurement result is not transmitted when it is judged that the value of the variation amount is not equal to or more than the predetermined value.

The information processing device is, for example, the controller 12 in FIG. 2, and the acquiring means are, for example, the interface 23 in FIG. 4. The transmitting means are, for example, the communication section 32 in FIG. 4, and the judging means are, for example, the processor 31 in FIG. 4 that executes the processing of step S18 in FIG. 5.

According to the above-mentioned information processing device, in cases where a state, in which the second measurement result is not transmitted when the value of the variation amount is judged by the judging means to not be equal to or more than the predetermined value, continues for a predetermined time interval, the second measurement result can be transmitted by the transmitting means irrespective of the judgment result yielded by the judging means. Thus, the state of the information processing device can be confirmed at predetermined times.

According to the above-mentioned information processing device, in cases where the judging means judge the value of the variation amount to be equal to or more than the predetermined value, the judging means also judge whether or not the value of the variation amount is equal to or more than a second predetermined value which is set as a larger value than the above-mentioned predetermined value, such that when the value of the variation amount is judged by the judging means to be equal to or more than the second predetermined value, the transmitting means are capable of transmitting, for a predetermined number of times, the measurement result acquired by the acquiring means at second predetermined intervals that are set as shorter intervals than the above-mentioned predetermined intervals, irrespective of the judgment of the judging means. Thus, when the variation amount is large, detailed measurement results can be acquired.

The information processing device can further comprise: storing means for storing a self-allocated telephone number; setting means for setting, as a number of seconds, a predetermined partial number string in a number string that constitutes the telephone number stored by the storing means; and determining means for using the number of seconds thus set by the setting means to determine a time at which to start the count of the predetermined intervals of the transmitting means. As a result, it is possible to prevent a plurality of information processing devices from transmitting a measurement result simultaneously and to thus alleviate the processing for receipt of the measurement results.

The information processing method to which the present invention is applied comprises: an acquiring step of acquiring measurement results measured by sensors; a transmission control step of controlling the transmission at predetermined intervals of the measurement results thus acquired by the processing of the acquiring step; and a judging step which, when a predetermined interval has elapsed after the transmission of a first measurement result is controlled by the processing of the transmission control step and at the time of the transmission of a second measurement result which is acquired by the processing of the acquiring step at this time, calculates the variation amount between the first measurement result and the second measurement result and judges whether or not the value of the calculated variation amount is equal to or more than a predetermined value, wherein the second measurement result is transmitted by means of the control performed by the processing of the transmission control step when the value of the variation amount is judged by the processing of the judging step to be equal to or more than the predetermined value, and the second measurement result is not transmitted when it is judged that the value of the variation amount is not equal to or more than the predetermined value.

The information processing method is a method executed by the controller 12 in FIG. 2, for example, and the acquiring step and transmission control step are, for example, step S19 in FIG. 5, while the judging step is step S18 in FIG. 5, for example.

According to the above-mentioned information processing method, in cases where a state, in which the second measurement result is not transmitted when the value of the variation amount is judged by the processing of the judging step to not be equal to or more than the predetermined value, continues for a predetermined time interval, the second measurement result is transmitted by being controlled by the processing of the transmission control step irrespective of the judgment result yielded by the processing of the judging step. Thus, the state of the information processing device can be confirmed at predetermined times.

According to the above-mentioned information processing method, in cases where the judging step judges the value of the variation amount to be equal to or more than the predetermined value, the judging step also judges whether or not the value of the variation amount is equal to or more than a second predetermined value which is set as a larger value than the predetermined value, such that when the value of the variation amount is judged by the processing of the judging step to be equal to or more than the second predetermined value, the transmission control step exercises control so as to transmit, for a predetermined number of times, the measurement result acquired by the processing of the acquiring step at second predetermined intervals that are set as shorter intervals than the predetermined intervals, irrespective of the judgment yielded by the processing of the judging step. Thus, when the variation amount is large, detailed measurement results can be acquired.

The information processing method can further comprise: storage control step of controlling the storage of a self-allocated telephone number; setting step of setting, as a number of seconds, a predetermined partial number string in a number string that constitutes the telephone number whose storage is controlled by the processing of the storage control step; and determining step of using the number of seconds thus set by the processing of the setting step to determine a time at which to start the count of the predetermined intervals of the processing of the transmission control step. As a result, it is possible to prevent a plurality of information processing devices from transmitting a measurement result simultaneously and to thus alleviate the processing for receipt of the measurement results.

According to the information processing device and method to which the present invention is applied, measurement results measured by sensors are transmitted at predetermined intervals, and, after a first measurement result is transmitted and at the time of the transmission of a second measurement result acquired when a predetermined interval has elapsed, the variation amount between the first measurement result and the second measurement result is calculated and it is judged whether or not the value of the variation amount thus calculated is equal to or more than a predetermined value such that when the value of the variation amount is equal to or more than the predetermined value, the second measurement result is transmitted, and when the value of the variation amount is not equal to or more than the predetermined value, the second measurement result is not transmitted, and hence the unnecessary transmission of measurement results can be prevented, whereby transmission charges can be suppressed.

BRIEF DESCRIPTION OF THE DRAWINGS

FIG. 6 serves to further illustrate the processing in the flowchart shown in FIG. 5;

FIG. 7 serves to further illustrate the processing in the flowchart shown in FIG. 5.

DESCRIPTION OF THE PREFERRED EMBODIMENTS

Figure 1:
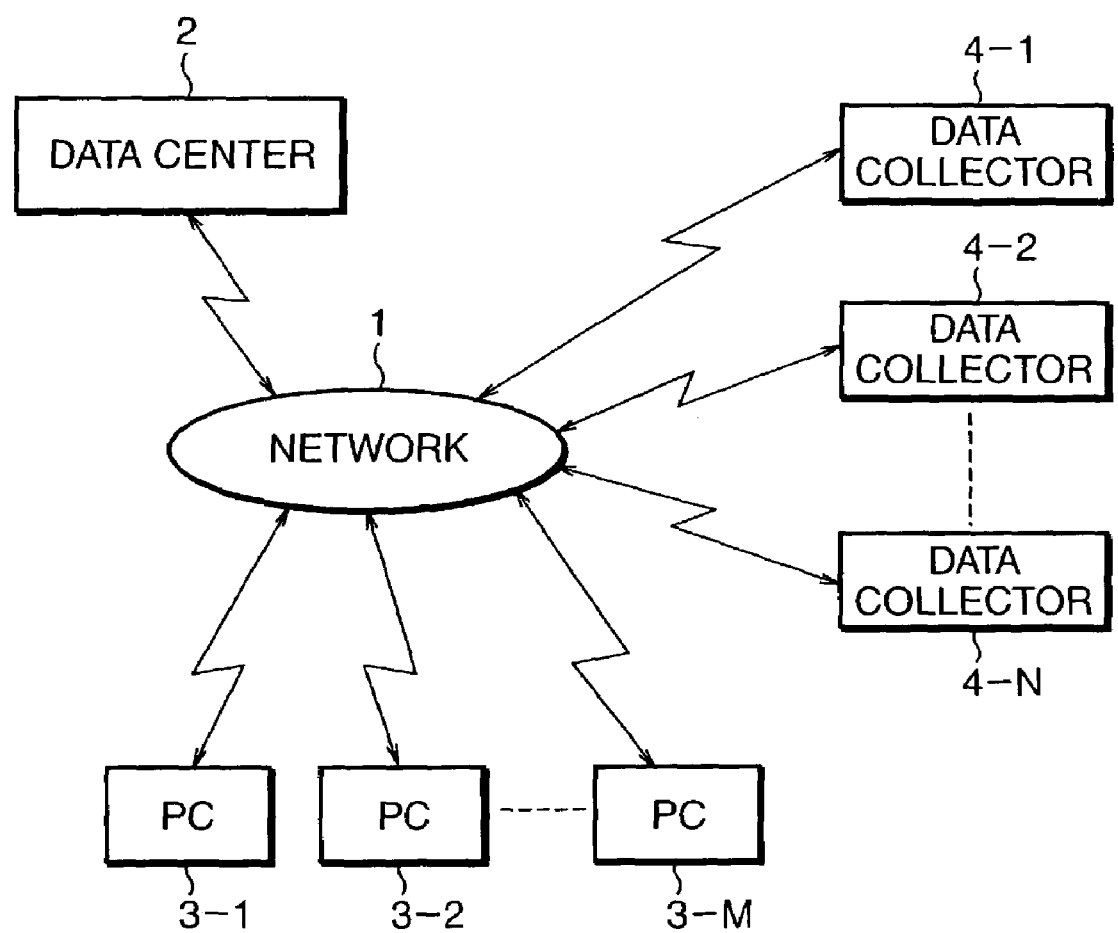
FIG. 1 shows the constitution of a first embodiment of the information processing system to which the present invention is applied.
Figure 2:
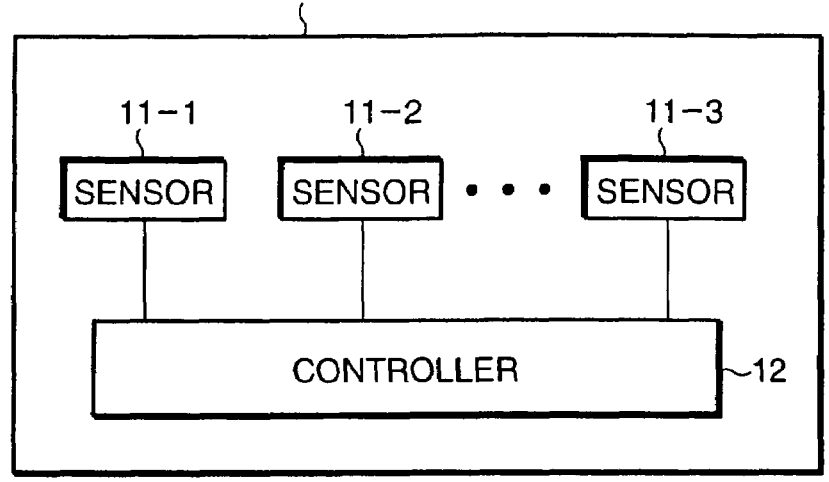
FIG. 2 shows a constitutional example of a data collector 4.

An embodiment of the present invention will be described below with reference to the drawings. FIG. 1 shows the constitution of the first embodiment of the information processing system to which the present invention is applied. A data center 2, PCs (personal computers) 3-1 to 3-M, and data collectors 4-1 to 4-N are connected to a network 1. The network 1 is constituted by the Internet, a LAN (Local Area Network), and the like and may be wireless or wired. The data center 2 receives and processes data values from controllers that are provided in the data collectors 4-1 to 4-N (described subsequently).

In the following description, the PCs 3-1 to 3-M will be described simply as 'PC 3' when there is no need to distinguish same individually. Other devices will also be described in the same way. Further, only one data center 2 is described in FIG. 1 but naturally a plurality thereof may also be present.

The data center 2 is a center known as an M2M (Machine to Machine), for example.

The PC 3 is a computer on the user side which manages the controller provided in the data collector 4, and performs processing using data values from the data center 2 that processes the data values obtained by the controller.

The data collector 4 is constituted by the controller 12 which controls respective sensors 11-1 to 11-N for measuring the residual amounts and components of predetermined materials. When the sensors 11 are installed in tanks (not illustrated) which store the predetermined materials, and so forth, and the residual amounts of the materials stored in the tanks are thus measured, the tanks are installed in households, factories, and the like, for example. When the tanks are installed in factories and the like, the data collectors 4 are constituted by a plurality of tanks in the factories.

The data values which are measured by the sensors 11 are supplied to the controller 12. The controller 12 and sensors 11-1 to 11-N may be connected by means of a wired connection or may be connected wirelessly. Further, these connections may form a network constituted by a LAN. The controller 12 also possesses the function of communicating with the sensors 11 and with other devices which receive data values and are connected to the network 1, such as the data center 2, for example.

Figure 3:
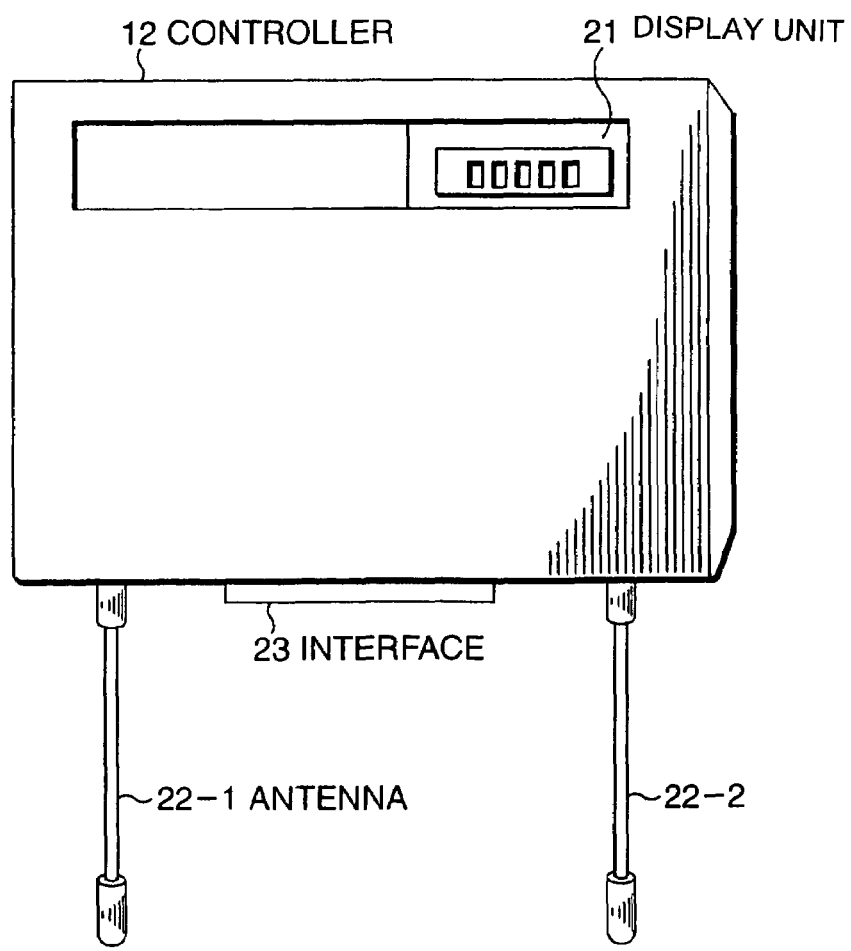
FIG. 3 shows a constitutional example of the controller 12 in an external view.

FIG. 3 shows the constitution of the controller 12 in an external view. The controller 12 is provided with a display unit 21 for displaying the states of the controller 12, such as the ON/OFF of the power supply, for example, and antennas 22-1 and 22-2 for communications with the data center 2 via the network 1. The controller 12 is further provided with an interface 23 which is connected to a sensor 11.

The types of sensor 11 connected to the interface 23 which may be used include, for example, floating-type sensors, pressure-type sensors, weight-type sensors, static capacitance-type sensors, ultrasonic level-type sensors, and wireless reader-type sensors. The user connects the sensors 11, which depend on the object which he or she wishes to measure, to the controller 12. A plurality of sensors 11 can be connected to the controller 12. When a plurality of sensors 11 is connected, these sensors 11 may be the same or different.

Figure 4:
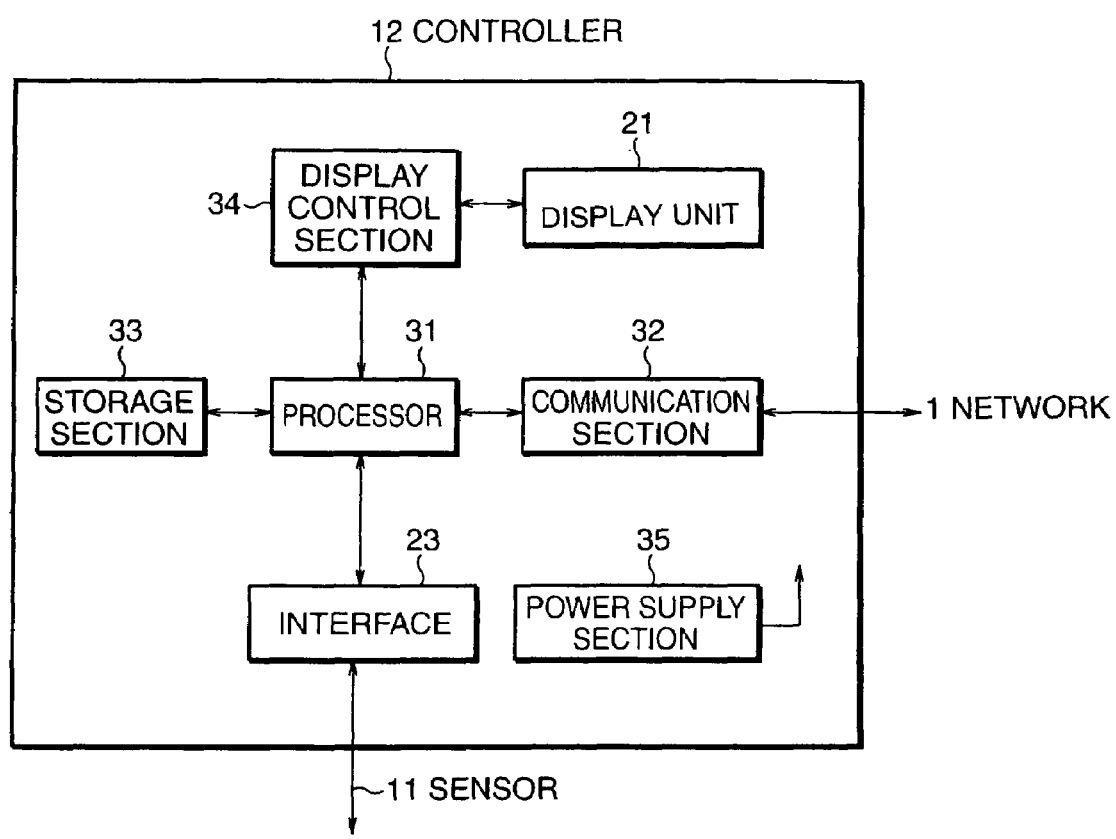
FIG. 4 shows an example of the internal constitution of the controller 12.

FIG. 4 shows an example of the internal constitution of the controller 12. The interface 23 of the controller 12 is connected to a sensor 11, lies between the sensor 11 and the processor 31 and performs processing to convert the received data values as well as other processing. Whenever required, the processor 31 transmits a data value, which is from the sensor 11 and inputted via the interface 23, from a communication section 32 to the data center 2 via the network 1.

The communication section 32 also receives the data values from the data center 2 which have been transmitted via the network 1 and supplies these data values to the processor 31. The processor 31 executes processing to store the data values thus supplied in a storage section 33 whenever required, and other processing. Data values such as programs which are required for the processor 31 to execute processing are also stored in the storage section 33.

A display control section 34 controls the display unit 21 on the basis of instructions from the processor 31. A power supply section 35 is supplied with a power voltage from a primary cell, a secondary cell, or an external A.C. supply, and performs control to supply the supplied supply voltage to the parts of the controller 12.

The processing for the receipt of data values which is executed between the controller 12 and the data center 2, and, more particularly, the processing by the controller 12 for the transmission of data values will now be described with reference to the flowchart in FIG. 5. The controller 12 sets basic numerical values in step S11. Here, the basic numerical values are the 'slot time interval', maximum slot time interval, 'start slot time', 'repetitive slot frequency' and 'data minimum variation amount'.

The 'slot time interval' is the minimum interval for a case where data values are transmitted. That is, even when a data value is to be transmitted, the transmission of the data value does not take place unless this interval has elapsed. For example, when the 'slot time interval' is set as fifteen minutes, after data value A has been transmitted, if at least fifteen minutes have not yet elapsed, the next data value B is not transmitted.

The 'maximum slot time interval' is the maximum interval during which a data value is not transmitted. That is, even when the judgment that a data value is not to be transmitted prevails, once this interval has elapsed since the transmission of the previous data value, even in the event of a judgment that a data value is not to be transmitted at this time, the data value is transmitted. For example, in cases where the 'maximum slot time interval' is set as two hours, when two hours have elapsed since the previous data value was transmitted, a data value is transmitted at a transmission time that succeeds this point in time even though this is a data value for which the judgment is made to not transmit a data value at this point in time.

The 'start slot time' is the time (reference timing) at which the transmission of a data value starts. The 'repetitive slot frequency' is a value for the calculation of the transmission time. For example, the transmission time is calculated by the following equation.

Transmission time='slot time interval'×(repetitive slot frequency'+1). For example, when the repetitive slot frequency' is set as 2, the transmission time is calculated as 45 minutes by the calculation 15×(2+1). That is, in this case, the setting is made to transmit a data value every 45 minutes.

The 'data minimum variation amount' is a setting item that serves to determine whether or not to transmit a data value, such that a data value is transmitted at the transmission time in cases where the variation amount between the data value acquired by the sensor 11 which was transmitted on the previous occasion and the data value acquired by the sensor 11 which is scheduled for transmission at the transmission time is equal to or more than the 'data minimum variation amount'. The 'data minimum variation amount' is set as 20, for example. The units are set according to the object which is to be measured by the sensor 11.

In step S11, when these basic numerical values are set at a point in time when the power supply of the controller 12 is ON for example, the transmission time value is calculated in step S12. As described above, the transmission time is calculated using the 'slot time interval' and the 'repetitive slot frequency'. In step S13, the transmission of the data value starts at the start slot time. The start slot time is a value set in step S11.

When a data value is transmitted at the start slot time in step S13, it is judged in step S14 whether it is the transmission time. In this case, if the following description is provided assuming that the above-described values are set, the transmission time is set as 45 minutes and hence it is judged whether or not 45 minutes have elapsed since the transmission of the previous data value. Until it is judged in step S14 that the transmission time has arrived, the processing of step S14 is repeated (the standby state is maintained), and when it is judged that the transmission time has arrived, step S15 follows.

In step S15, it is judged whether or not the maximum slot time interval has elapsed. When it is judged that the maximum slot time interval has elapsed, step S16 follows and the data value acquired by the sensor 11 is transmitted to the data center 2. Then, processing returns to step S14 and the processing of step S14 and beyond is repeated.

On the other hand, when it is judged in step S15 that the maximum slot time interval has not elapsed, step S17 follows and the previously transmitted data value and the data value scheduled for transmission on this occasion (that is, the data value acquired by the sensor 11 at this point in time) are compared. The processing of step S18 is then performed using the result of this comparison. The comparison result yielded by executing the processing of step S17 is the difference between the previously transmitted data value and the data value scheduled for transmission on this occasion, for example.

In step S18, it is judged whether or not the value representing the comparison result is equal to or more than the data minimum variation amount. When the comparison result is value produced by calculating a difference, it is judged whether or not this value is equal to or more than the data minimum variation amount. Further, the value of the difference of the comparison result is an absolute value.

When it is judged in step S18 that the value representing the comparison result is equal to or more than the data minimum variation amount, step S19 follows, and when it is judged that the comparison result is equal to or less than the data minimum variation amount, processing returns to step S14 and the processing of step S14 and beyond is repeated.

In step S19, the data value which has been acquired by the sensor 11 is transmitted to the data center 2. When transmission is complete, step S20 follows and it is judged whether or not the value representing the comparison result yielded by the processing of step S17 is equal to or more than two times the data minimum variation amount. Here, the description is made assuming a judgment of whether the value is equal to or more than two times the data minimum variation amount but another value based on a multiple of three or the like may also be set. The processing of step S20 is processing to judge whether or not the variation amount is comparatively large.

In step S20, it is judged whether or not the value representing the comparison result is a value that is equal to or more than two times the data minimum variation amount. Here, when this value is judged to be equal to or more than two times this variation amount, step S21 follows, and when this value is not judged to be equal to or more than two times this variation amount, step S14 follows and the processing of step S14 and beyond is repeated.

In step S21, it is judged whether or not it is the transmission time. The judgment in step S21 of whether or not it is the transmission time is performed in the same manner as that of step S14. In step S21, when it is judged that it is the transmission time, the processing returns to step S17 and the processing of step S17 and beyond is repeated, and when it is judged that it is not the transmission time, step S22 follows. In step S22, it is judged whether or not the next slot interval has been reached.

When it is judged in step S22 that the next slot interval has not yet been reached, processing returns to step S21 and the processing of step S21 and beyond is repeated, and when it is judged that the next slot interval has been reached, step S23 follows and the data value acquired by the sensor 11 is transmitted to the data center 2. Then, processing returns to step S21, and the processing of step S21 and beyond is repeated.

Figure 5:
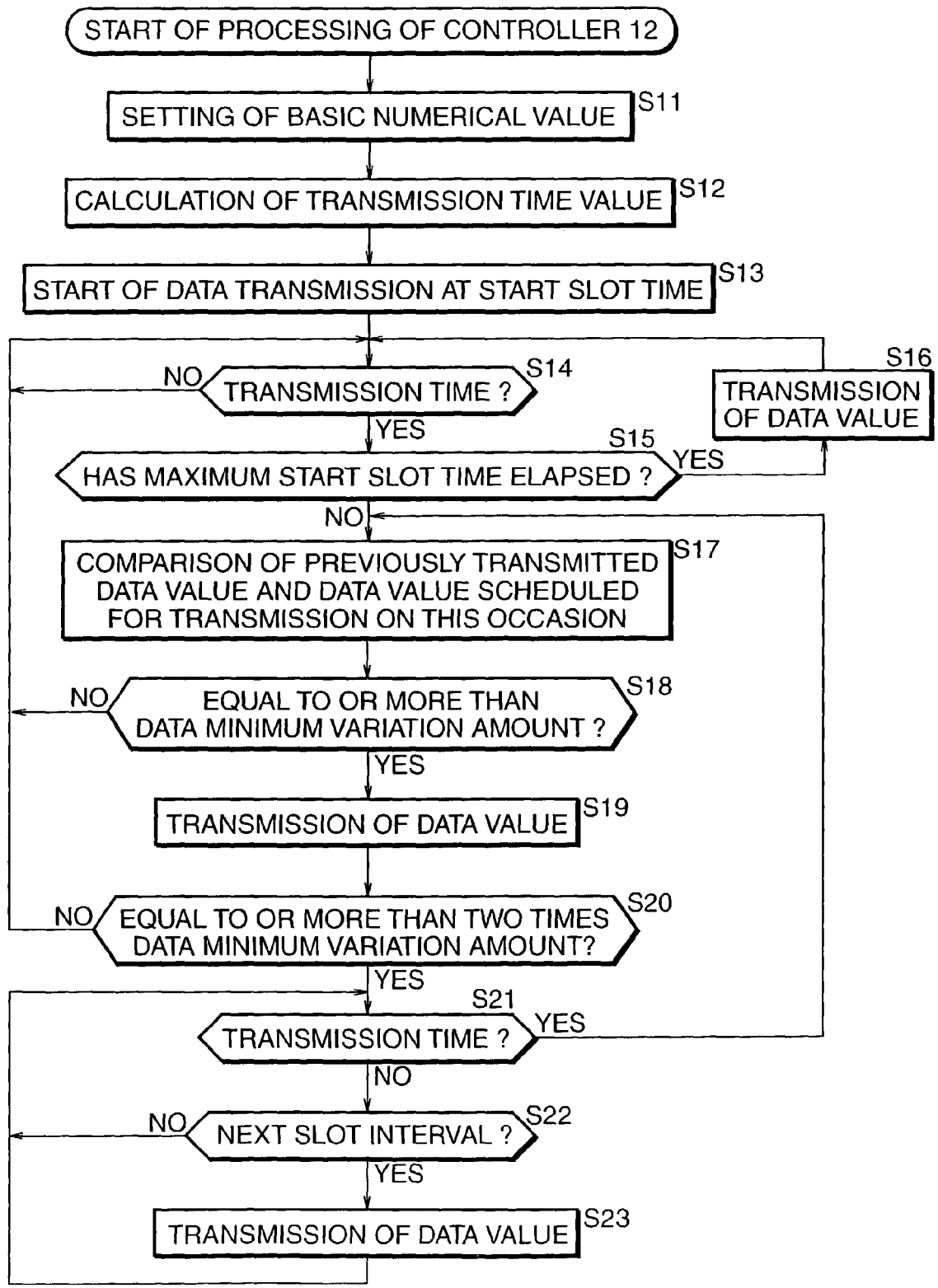
FIG. 5 is a flowchart to illustrate the processing by the controller 12.

A description will also be provided for the processing of the controller 12 on the basis of FIGS. 6 and 7 and the flowchart in FIG. 5. FIGS. 6 and 7 show a case where the 'slot time interval' is set as 15 minutes, the maximum slot time interval' as two hours, the 'start slot time' as 0:00, the 'repetitive slot frequency' as 2, and the 'data minimum variation amount' as 20. The transmission time in such a case is therefore set to be every 45 minutes.

When the processing of steps S11 and S12 is executed at a point when the power supply of the controller 12 is ON for example, in step S13, the start slot time, that is, the state shown in position 'A' in FIG. 6 is assumed, and the data value '100' acquired by the sensor 11 is transmitted to the data center 2. As for the states of positions 'B' and 'C', the respective data value is not transmitted because the judgment is made in step S14 that it is not the transmission time.

When the state of position 'D' is assumed, because the judgment is made in step S14 that it is the transmission time, step S15 follows and it is judged whether or not the maximum slot time interval has elapsed. However, from state 'A' until state 'D', 45 minutes have not elapsed and hence it is judged that the maximum slot time interval has not yet elapsed and step S17 follows.

In the processing of step S17, the difference between '100', which is the data value at position A and '120', which is the data value at position D, is calculated to be '20'. The processing of step S18 is then executed using this result. As is known, it is judged in step S18 whether or not the difference value '20' thus calculated is equal to or more than the data minimum variation amount. However, in this case, the result of the judgment is 'YES' because the data minimum variation amount is '20' and hence step S19 follows and the data value '120' is transmitted to the data center 2.

When the data value is transmitted in step S19, step S20 follows and, as is known, it is judged whether or not the difference value calculated in step S17 is equal to or more than two times the data minimum variation amount. However, in this case, the result of the judgment is 'NO' because the difference value is '20' and two times the data minimum variation amount is '40'. Hence, processing returns to step S14 and the processing of step S14 and beyond is repeated.

In the states of the positions E to L, as a result of the processing of steps S14 to S20 being executed in the same manner as the above-described case, the respective data values are transmitted to the data center 2 for the states of positions G and J. Further, when, by comparing the data value for the state of position G with that during the state of position D and comparing the data value for the state of position J with that during the state of position G, it is judged for the states of positions G and J that the data value variation is equal to or more than the data minimum variation amount, the respective data values are transmitted to the data center 2.

When the state of position M is assumed, the difference value of the data value '120' of position M and the data value '120' of position J is calculated as '0' by the processing of step S17, and this difference value '0' is judged to not be equal to or more than the data minimum value by the processing of step S18. Therefore, step S19 does not follow and the processing whereby the data value is transmitted to the data center 2 is not performed even at the transmission time.

Thus, when there is no change in a data value, the data value is not transmitted to the data center 2, and hence the charges incurred for the transmission of this data value are not generated, and, as a result, an increase in the charges can be suppressed.

In the states of positions N to R, the processing of steps S14 to S18 is executed in the same manner as the above-described case, and, as a result, the state where data value is transmitted is not generated, and the processing in which the data value is transmitted to the data center 2 is not executed.

When the state of position S is assumed, the judgment is made in step S14 that it is the transmission time and, because it is judged in step S15 that the maximum slot time interval has elapsed, step S16 follows and the data value is transmitted to the data center 2. As for the state of position S, because two hours constituting the maximum slot time interval have elapsed since the time at position J at which the previous data value was transmitted and it is the transmission time, processing in which the data value is transmitted is executed.

Thus, even in a case where a state in which there is no change in the data value continues and the data value is not transmitted, because, when a fixed interval has elapsed, this value is transmitted even if there is no change in the data value, the fact that the data value is in an unchanged state can be shown.

In addition, as a result of settings being made so that a data value is transmitted when a fixed interval (two hours in this case) has elapsed, assuming that a state arises where the data value cannot be transmitted due to failure of the controller 12, for example, the situation where the data value cannot be transmitted due to such failure can be judged on the data center 2 side, and when such a situation (situation in which it is possible to transmit a data value even after a fixed interval has elapsed) has occurred, such a situation can be dealt with promptly.

A description will also be provided for the processing of the controller 12 on the basis of the flowchart in FIG. 5 with reference to FIG. 7. As for the states in the positions A to C, as a result of executing the processing of steps S11 to S14, the data value of only the state of position A is transmitted to the data center 2.

When the state of position D is assumed, step S15 follows step S14 and the processing progresses to step S17, whereby the difference value is calculated as '60'. Then, the processing of step S18 yields a YES judgment, and then step S19 follows and the data value '160' is transmitted to the data center 2. In addition, in this case, the difference value is '60' and two times the data minimum variation amount is '40', meaning that step S20 yields a YES judgment and the processing progresses to step S21.

When the state of position E is assumed, it is judged in step S21 that it is not the transmission time and step S22 follows. For the state of position E, it is judged in step S22 that the next slot interval has been reached. In other words, in this case, because 15 minutes of the slot time interval have elapsed since position D, it is judged that the next slot interval has been reached and step S23 follows such that the data value '200' is transmitted to the data center 2.

Also in the state of position F, the data value '170' is transmitted as a result of executing processing like that for the state of position E (processing of steps S21 to S23).

Thus, when it is judged in step S20 that the difference value is two times the data minimum variation amount, because the data value has changed abruptly, it is judged that detailed data acquisition (transmission) is preferable, and settings are made so that data is transmitted even though the timing is not the transmission time and even during states like those for positions E to F, for example.

As a result of such settings, when an abrupt change occurs, detailed data value transmission is then made possible and the user is able to acquire a detailed data value variation when there is an abrupt change. For example, a situation where a data value changes abruptly due to there being a problem of some kind with the device in which the sensor 11 is installed or due to sudden consumption of raw materials can be confirmed at an early stage by the data center 2, meaning that measures of some kind can then be taken.

When the state of position G shown in FIG. 7 is assumed, because the judgment is made in step S21 that it is the transmission time, processing returns to step S17 and the processing of step S17 and beyond is executed. The difference between the data value '170' which is transmitted at position F and the data value '140' at position G is calculated by the processing of step S17. The result of calculating this difference is '30' and is therefore judged in step S18 as being equal to or more than the data minimum variation amount, and the data value '140' is therefore transmitted to the data center 2 in step S19.

During the processing of step S17, that is, when the difference value is calculated, the difference value between the previously transmitted data value and the data value scheduled for transmission on this occasion is calculated. However, as described earlier, in the case of position G, the data value at position F may be used as the previously transmitted data value, and the data value which is the previously transmitted data value and which was transmitted at the transmission time, that is, here, the data value at position D, may be used for position F.

The states of positions E and F are data values which are transmitted especially by virtue of the large data value variation, and therefore the decision of whether or not to use the calculation of these data values in step S17 may be set in accordance with the device and status of the device in which the sensor 11 is installed, for example.

The difference value is '20' even if the state of position G is compared with the data value at position D, and, as a result, the judgment of step S18 yields a YES and the data value is transmitted to the data center 2 in step S19. Thereafter, because the processing of step S20 yields a NO judgment, processing returns to step S14 and the processing of step S14 and beyond is repeated.

In the states of positions H to O, as a result of the processing of steps S14 to S18 being executed in the same manner as in the above-described case, the data value is not transmitted to the data center 2. When the state of position P is assumed, although there is no change in the data value, because two hours which constitute the maximum slot time interval have elapsed since the state of the position G when the previous data value was transmitted and since the transmission time has been reached, that is, because the steps S14 and S15 yield a YES judgment, step S16 follows and the data value is transmitted to the data center 2.

Thus, when the data-value variation amount is small, the corresponding data value is not transmitted and hence the charges incurred for the transmission of this data value can be suppressed. Conversely, when the data-value variation amount is large, the corresponding data is transmitted over a short interval and hence when there is a change in the data, the data value can be acquired in more detail. In addition, even when the data-value variation amount is small, when a fixed interval has elapsed, a data value is transmitted and hence the state of the controller 12 can be grasped at fixed intervals.

Further, let us assume, for example, a case in which 10,000 controllers 12 are installed and the data values from the controllers 12 are transmitted to the data center 2. In such a case, when data values are transmitted from the 10,000 controllers 12 all at once, the data center 2 must possess the capacity to process data values in an amount equivalent to the 10,000 controllers.

Figure 8:
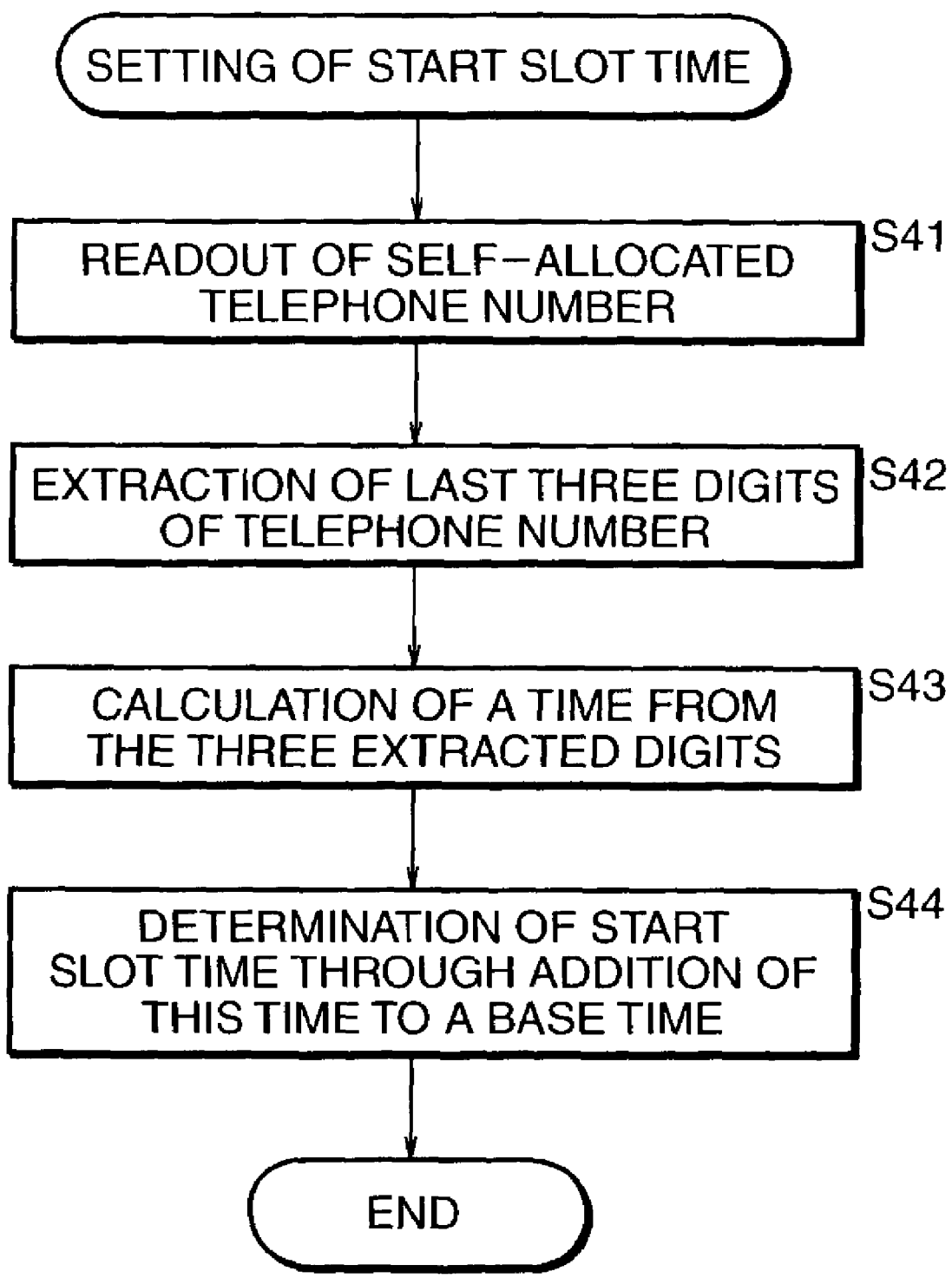
FIG. 8 is a flowchart serving to illustrate the setting of the start slot time.

For example, in a case where all the start slot times are set as the same time, namely 0:00, it is probable that, at the time 0:00, the situation described above will occur as a result of the data values from the 10,000 controllers 12 being transmitted. In order to prevent such an event, the start slot times are set by each controller 12 in accordance with the processing of the flowchart in FIG. 8.

The controller 12 stores a self-allocated telephone number in a storage unit 33 (FIG. 4). The start slot time is set by using this telephone number. In step S41, the processor 31 (FIG. 4) of the controller 12 reads out this self-allocated telephone number from the storage unit 33. In step S42, the last three digits of the telephone number thus read out are extracted.

The telephone number normally consists of ten digits. For example, when the telephone number is 03-1234-5678, the last three digits 678 are extracted as in step S42. In step S43, the time is calculated from the last three digits thus extracted. As an example of the time calculation of step S43, the last three digits thus extracted are substituted for a time in minutes. Here, because the last three digits thus extracted are '678', these digits are substituted for 678 seconds.

In step S44, the time calculated in step S43 is added to a base time to determine the start slot time. In this case, a time which is produced by adding 678 seconds to 0:00 is set as the new start slot time. Thereafter, with this start slot time as the reference, the above-described processing of the flowchart shown in FIG. 5 is executed. In other words, the count of an interval such as the transmission time starts from the start slot time thus set.

In a case where the start slot time is set in this manner, because the last three digits of the telephone number are used, the transmission times for the 10,000 controllers 12 are distributed over a 1000-second interval from 000 seconds to 999 seconds. Among the 10,000 controllers 12, there is, in theory, the possibility that 10 controllers 12 will have the last three digits of the same telephone number, and the possibility that data values will be transmitted from ten controllers 12 every second.

However, it can be seen that, as a result of attempting distribution of this kind for a case where there is the possibility of data values being transmitted simultaneously from 10,000 controllers 12, there is then only the possibility of data values being transmitted simultaneously from an extremely small number of the controllers 12.

Hence, the distribution of the timing for the transmission of the data values by using the last three digits of a telephone number is an effective measure. As a result, even in the absence of a data center 2 that has the capacity to simultaneously process data values from the 10,000 controllers 12, the data values from the controllers 12 can be adequately processed, whereby the cost associated with the construction of the data center 2 can be reduced.

Further, according to the present embodiment, the last three digits of a telephone number are employed but any number of digits, such as four digits, could also be used. Also, other processing may be executed in addition to simply substituting the last three digits for seconds. Moreover, other numbers such as production numbers or the like could be used instead of telephone numbers.

As described hereinabove, according to the information processing device and method to which the present invention is applied, measurement results measured by sensors are transmitted at predetermined intervals, and, after a first measurement result is transmitted and at the time of the transmission of a second measurement result acquired when a predetermined interval has elapsed, the variation amount between the first measurement result and the second measurement result is calculated and it is judged whether or not the value of the variation amount thus calculated is equal to or more than a predetermined value such that when the value of the variation amount is equal to or more than the predetermined value, the second measurement result is transmitted, and when the value of the variation amount is not equal to or more than the predetermined value, the second measurement result is not transmitted, and hence the unnecessary transmission of measurement results can be prevented, whereby transmission charges can be suppressed.

What is claimed is:

1. An information processing device, comprising:

acquiring means for acquiring data values measured by sensors;

transmitting means for transmitting the data values via a network, judging means which, when a first predetermined interval has elapsed after a first data value is transmitted by the transmitting means and at the time of transmission of a second data value which is acquired by the acquiring means, calculates a first absolute variation amount between the first data value and the second data value and judges whether or not the value of the calculated first absolute variation amount is equal to or more than a first predetermined value;

storing means for storing a self-allocated telephone number;

setting means for setting a start time, which is a calculated time based on a predetermined partial number string that constitutes the self-allocated telephone number stored by the storing means; and control means for controlling the transmitting means so that the second data value is transmitted by the transmitting means when the first absolute variation amount is judged by the judging means to be equal to or more than the first predetermined value, and the second data value is not transmitted when it is judged that the first absolute variation amount is not equal to or more than the first predetermined value, whereby the first predetermined interval is counted from the start time set by the setting means.

2. The information processing device according to claim 1, wherein in cases where the second data value is not transmitted when the first absolute variation amount is judged by the judging means to not be equal to or more than the first predetermined value, after a second predetermined time interval, the transmitting means controlled by the control means will transmit the second data value irrespective of the judgment result yielded by the judging means.

3. The information processing device according to claim 1, wherein in cases where the judging means judges the first absolute variation amount to be equal to or more than the first predetermined value, the judging means also judges whether or not a second variation amount is equal to or more than a second predetermined value, the second predetermined value being set as a larger value than the first predetermined value, such that when the second variation amount is judged by the judging means to be equal to or more than the second predetermined value, the control means controlling the transmitting means for a predetermined number of times, so that a third data value acquired by the acquiring means at a second predetermined interval that is shorter than the first predetermined interval, is transmitted irrespective of the judgment of the judging means.

4. An information processing method, comprising:
- an acquiring step of acquiring data values measured by sensors;
- a transmission control step of controlling the transmission of the data values;
- a judging step which, when a first predetermined interval has elapsed after the transmission of a first data value is controlled by processing of the transmission control step and at the time of transmission of a second data value, which is acquired by processing of the acquiring step, calculates a first absolute variation amount between the first data value and the second data value and judges whether or not the value of the calculated first absolute variation amount is equal to or more than a first predetermined value;
- a storing step for storing a self-allocated telephone number;
- a setting step for setting a start time, which is a calculated time based on a predetermined partial number string that constitutes the self-allocated telephone number stored by the storing step; and
- a control step for controlling the transmission control step so that the second data value is transmitted by means of the control performed by the processing of the transmission control step when the first absolute variation amount is judged by processing of the judging step to be equal to or more than the first predetermined value, and the second data value is not transmitted when it is judged that the first absolute variation amount is not equal to or more than the first predetermined value, whereby the first predetermined interval is counted from the start time set by the setting step, wherein in cases where the second data value is not transmitted when the first absolute variation amount is judged by the processing of the judging step to not be equal to or more than the first predetermined value, after a second predetermined time interval, the transmission control step controlled by the control step will transmit the second data value irrespective of the judgment result yielded by the processing of the judging step.

* * * * *